United States Patent
Reed et al.

(10) Patent No.: US 11,467,972 B2
(45) Date of Patent: Oct. 11, 2022

(54) L1D TO L2 EVICTION

(71) Applicant: CENTAUR TECHNOLOGY, INC., Austin, TX (US)

(72) Inventors: Douglas Raye Reed, Austin, TX (US); Colin Eddy, Austin, TX (US)

(73) Assignee: CENTAUR TECHNOLOGY, INC., Austin, TX (US)

( * ) Notice: Subject to any disclaimer, the term of this patent is extended or adjusted under 35 U.S.C. 154(b) by 8 days.

(21) Appl. No.: 17/108,499

(22) Filed: Dec. 1, 2020

(65) Prior Publication Data

US 2022/0171712 A1   Jun. 2, 2022

(51) Int. Cl.
*G06F 12/0891* (2016.01)
*G06F 9/30* (2018.01)
*G06F 12/0811* (2016.01)
*G06F 12/0817* (2016.01)
*G06F 12/0871* (2016.01)

(52) U.S. Cl.
CPC ...... *G06F 12/0891* (2013.01); *G06F 9/30043* (2013.01); *G06F 9/30047* (2013.01); *G06F 12/0811* (2013.01); *G06F 12/0817* (2013.01); *G06F 12/0871* (2013.01)

(58) Field of Classification Search
CPC ............ G06F 12/0811; G06F 12/0891; G06F 9/30047; G06F 9/30043; G06F 12/0817; G06F 12/0871; Y02D 10/00
USPC ........................................ 711/154, 143, 122
See application file for complete search history.

(56) References Cited

U.S. PATENT DOCUMENTS

| | | | | |
|---|---|---|---|---|
| 5,924,121 A | * | 7/1999 | Arimilli | G06F 12/0804 711/143 |
| 2010/0228922 A1 | * | 9/2010 | Limaye | G06F 12/126 711/135 |
| 2014/0006716 A1 | * | 1/2014 | Steeley, Jr. | G06F 15/167 711/130 |
| 2018/0004661 A1 | * | 1/2018 | Umehara | G06F 12/0808 |
| 2019/0266101 A1 | * | 8/2019 | Robinson | G06F 12/0831 |
| 2020/0242049 A1 | * | 7/2020 | Loh | G06F 12/0871 |

* cited by examiner

*Primary Examiner* — Hashem Farrokh

(74) *Attorney, Agent, or Firm* — McClure, Qualey & Rodack, LLP

(57) ABSTRACT

In one embodiment, a microprocessor, comprising: a first data cache; and a second data cache configured to process both a miss in the first data cache resulting from a first load or store operation and an eviction from the first data cache to accommodate the first load or store operation, the second data cache configured to indicate to the first data cache that the eviction is complete before the eviction is actually complete based on a first state corresponding to the eviction.

20 Claims, 4 Drawing Sheets

L1D TO L2 EVICTION

TECHNICAL FIELD

The present invention relates in general to microprocessors, and more particularly, to cache memory systems in microprocessors.

BACKGROUND

Most modern computer systems include a microprocessor that performs the computations necessary to execute software programs. Computer systems also include other devices connected to (or internal to) the microprocessor, such as memory. The memory stores the software program instructions to be executed by the microprocessor. The memory also stores data that the program instructions manipulate to achieve the desired function of the program.

The devices in the computer system that are external to the microprocessor (or external to a processor core), such as the memory, are directly or indirectly connected to the microprocessor (or core) by a processor bus. The processor bus is a collection of signals that enable the microprocessor to transfer data in relatively large chunks. When the microprocessor executes program instructions that perform computations on the data stored in the memory, the microprocessor fetches the data from memory into the microprocessor using the processor bus. Similarly, the microprocessor writes results of the computations back to the memory using the processor bus.

The time required to fetch data from memory or to write data to memory is many times greater than the time required by the microprocessor to perform the computation on the data. Consequently, the microprocessor must inefficiently wait idle for the data to be fetched from memory. To reduce this problem, modern microprocessors include at least one cache memory. The cache memory, or cache, is a memory internal to the microprocessor (or processor core)—typically much smaller than the system memory—that stores a subset of the data in the system memory. When the microprocessor executes an instruction that references data, the microprocessor first checks to see if the data is present in the cache and is valid. If so, the instruction can be executed more quickly than if the data had to be retrieved from system memory since the data is already present in the cache. That is, the microprocessor does not have to wait while the data is fetched from the memory into the cache using the processor bus. The condition where the microprocessor detects that the data is present in the cache and valid is commonly referred to as a cache hit. The condition where the referenced data is not present in the cache is commonly referred to as a cache miss. When the referenced data is already in the cache memory, significant time savings are realized, by avoiding the extra clock cycles required to retrieve data from external memory.

In some microprocessors, the cache is actually made up of multiple caches. The multiple caches are arranged in a hierarchy of multiple levels. For example, a microprocessor may have two types of caches, referred to as a first-level or level1 (L1) cache and a second-level or level2 (L2) cache. The L1 cache is closer to the computation elements of the microprocessor than the L2 cache. That is, the L1 cache is capable of providing data to the computation elements faster than the L2 cache. The L2 cache is commonly larger than the L1 cache, although not necessarily. There may even be third-level (L3) cache, which is even larger than the L1 and L2 caches, after which access is ultimately (in the case of a miss) to system memory.

In many microprocessor architectures, the L1 cache is actually made up of two caches, an L1 instruction (L1I) cache and an L1 data (L1D) cache. With particular emphasis on the L1D cache for purposes of this disclosure, it is desired for the sake of speed and efficiency that load and store instructions hit in the L1D cache. If there is a miss, then a cache line needs to be brought in from elsewhere, and preferably the L2 cache. However, a cache line may also need to be evicted from the L1D cache, such as to allocate room for the new cache line. To handle these tasks, the L2 cache accesses tag and data array pipelines, which are also receiving requests from other sources (e.g., I-cache requests, external snoops, evictions from the L2 cache to the L3 cache, etc.). Though it is desired from a performance standpoint to satisfy, say, a load request per single clock cycle out of the L2 cache, attaining this benchmark is complicated by the fact that other sources of requests are seeking to access the tag array and data array pipelines, which impedes the ability of the L2 to process load requests. In fact, it has been observed that evictions to the L2 cache are often delayed due to the backlog of L1D cache evictions in the L2 cache, primarily due to the inability to keep up with a steady stream of simultaneous loads and evictions.

SUMMARY

In one embodiment, a microprocessor, comprising: a first data cache; and a second data cache configured to process both a miss in the first data cache resulting from a first load or store operation and an eviction from the first data cache to accommodate the first load or store operation, the second data cache configured to indicate to the first data cache that the eviction is complete before the eviction is actually complete based on a first state corresponding to the eviction.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Figure 1:
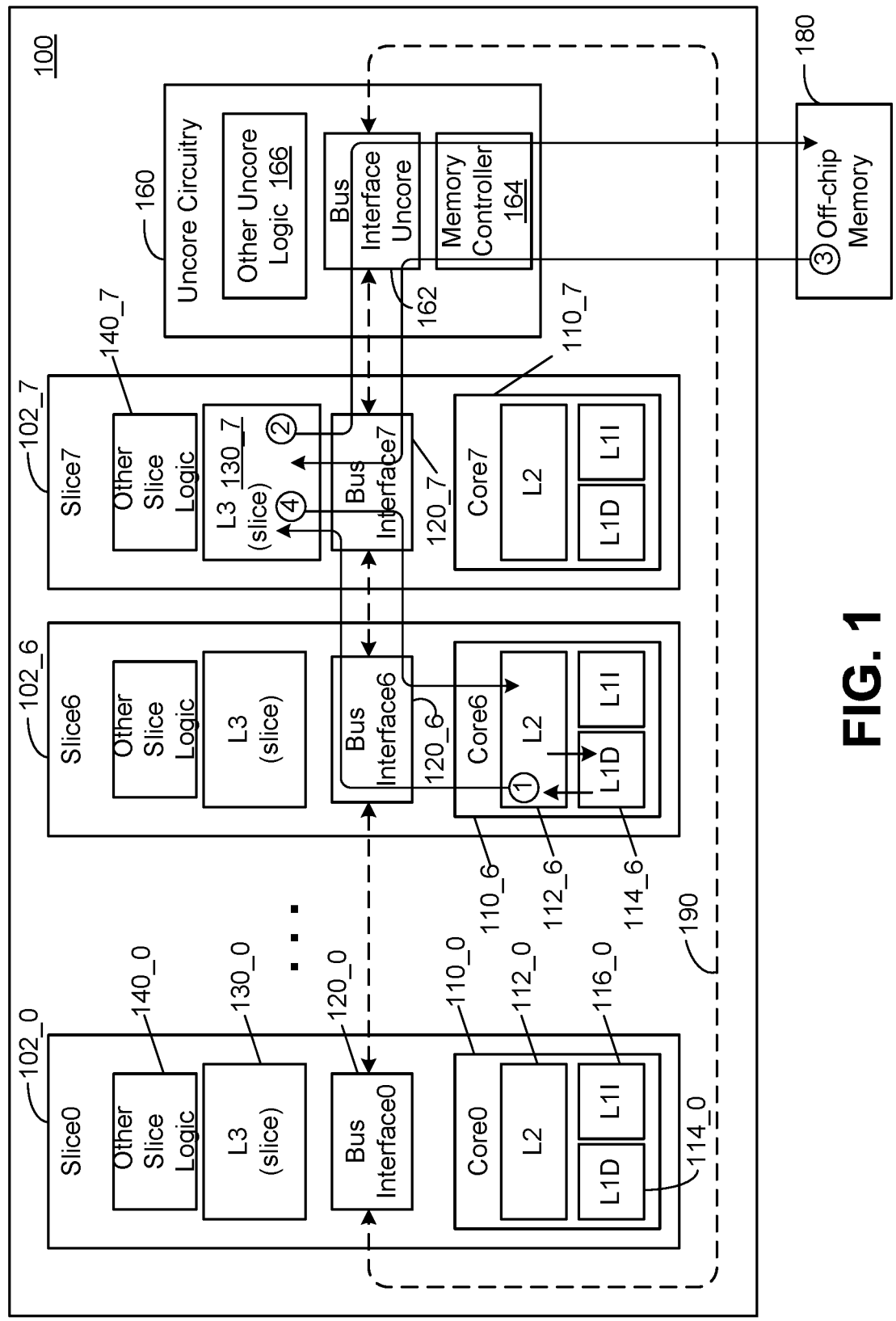
FIG. 1 is a block diagram showing an example multi-core processor implementing an embodiment of a cache data eviction system.

Certain embodiments of a cache data eviction system and method are disclosed that mitigate a backlog of first-level (L1) data cache evictions in a second-level (L2) data cache, especially in circumstances where there exists a steady stream of simultaneous loads and evictions. In one embodiment, the L2 data cache recognizes a state where the eviction from the L1 data cache corresponds to evicted data (e.g., cache line) having a clean or unmodified state, and under such conditions, immediately (e.g., within approximately two clock cycles) indicates to the L1 data cache that the eviction is complete before the eviction is actually complete (e.g., via an update of the L2 cache directory). By doing so, evictions reallocated to the same entry as the last eviction may proceed to the L2 data cache without delay, hence preventing the backlog of L1 data cache evictions for such states.

Digressing briefly, existing cache memory systems often experience a backlog of L1 data cache evictions because access to the L2 tag and/or data array pipelines needed in evictions are competing with other sources attempting to access the tag and/or data arrays. Due to these plural contentions for the pipeline resource, the lower priority evictions are often delayed, leading to the backlog. That is, while processing the evictions, the L1 data cache is awaiting an indication from the L2 data cache that the eviction is complete, and until then, an entry in the L1 data cache for enabling the processing of these evictions is unable to process subsequent evictions from that same entry until processing in the L2 data cache of that first eviction has completed. In contrast, certain embodiments of a cache data eviction system recognize when the data or cache line to be evicted is clean (e.g., an exclusive or shared MESI state), since evicting a clean cache line is not required for cache coherency but merely updating a directory of the L2 data cache, enabling the cache data eviction to indicate to the L1 data cache that the eviction is complete before it is actually complete, preventing the backlog of L1 data cache evictions for clean cache lines.

Having summarized certain features of a cache data eviction system of the present disclosure, reference will now be made in detail to the description of a cache data eviction system as illustrated in the drawings. While a cache data eviction system will be described in connection with these drawings, there is no intent to limit it to the embodiment or embodiments disclosed herein. That is, while the invention is susceptible to various modifications and alternative forms, specific embodiments thereof are shown by way of example in the drawings and will herein be described in detail sufficient for an understanding of persons skilled in the art. For instance, though examples are provided where load/store allocations are to, and evictions from, the L1 data cache to the L2 cache, it should be appreciated by one having ordinary skill in the art that similar principles may be applied to other cache hierarchies, including allocations and evictions from, say, L2 cache to L3 cache in some embodiments. Thus, it should be understood that the drawings and detailed description thereto are not intended to limit the invention to the particular form disclosed. On the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, modules, circuits, logic, or other components may be described as "configured to" perform a task or tasks. In such contexts, "configured to" is a broad recitation of structure generally meaning "having circuitry or another physical structure that" performs, or is capable of performing, the task or tasks during operations. The circuitry may be dedicated circuitry, or more general processing circuitry operating under the control of coded instructions. That is, terms like "unit", "module", "circuit", "logic", and "component" may be used herein, in describing certain aspects or features of various implementations of the invention. It will be understood by persons skilled in the art that the corresponding features are implemented utilizing circuitry, whether it be dedicated circuitry or more general purpose circuitry operating under micro-coded instruction control.

Further, the unit/module/circuit/logic/component can be configured to perform the task even when the unit/module/circuit/logic/component is not currently in operation. Reciting a unit/module/circuit/logic/component that is configured to perform one or more tasks is expressly intended not to invoke 35 U.S.C. § 112(f) for that unit/module/circuit/logic/component. In this regard, persons skilled in the art will appreciate that the specific structure or interconnections of the circuit elements will typically be determined by a compiler of a design automation tool, such as a register transfer language (RTL) compiler. RTL compilers operate upon scripts that closely resemble assembly language code, to compile the script into a form that is used for the layout or fabrication of the ultimate circuitry.

That is, integrated circuits (such as those of the present invention) are designed using higher-level software tools to model the desired functional operation of a circuit. As is well known, "Electronic Design Automation" (or EDA) is a category of software tools for designing electronic systems, such as integrated circuits. EDA tools are also used for programming design functionality into field-programmable gate arrays (FPGAs). Hardware descriptor languages (HDLs), like Verilog and very high-speed integrated circuit hardware description language (VHDL) are used to create high-level representations of a circuit, from which lower-level representations and ultimately actual wiring can be derived. Indeed, since a modern semiconductor chip can have billions of components, EDA tools are recognized as essential for their design. In practice, a circuit designer specifies operational functions using a programming language like C/C++. An EDA software tool converts that specified functionality into RTL. Then, a hardware descriptor language (e.g. Verilog) converts the RTL into a discrete netlist of gates. This netlist defines the actual circuit that is produced by, for example, a foundry. Indeed, these tools are well known and understood for their role and use in the facilitation of the design process of electronic and digital systems, and therefore need not be described herein.

As will be described herein, the present invention is directed to a cache data eviction system. Before describing an example cache data eviction system, however, one exemplary architecture is described, in which the cache data eviction system may be utilized. In this regard, reference is now made to FIG. 1, which is a diagram illustrating a multi-core processor 100 (also referred to herein as a microprocessor 100). As will be appreciated by persons having ordinary skill in the art from the description provided herein, the present invention may be implemented in a variety of various circuit configurations and architectures, and the architecture illustrated in FIG. 1 is merely one of many suitable architectures. Specifically, in the embodiment illustrated in FIG. 1, the processor 100 is an eight-core processor, wherein the cores are enumerated core0 110_0 through core7 110_7.

In the illustrated embodiment, numerous circuit components and details are omitted, which are not germane to an understanding of the present invention. As will be appreciated by persons skilled in the art, each processing core (110_0 through 110_7) includes certain associated or companion circuitry that is replicated throughout the processor 100. Each such related sub-circuit is denoted in the illustrated embodiment as a slice. With eight processing cores 110_0 through 110_7, there are correspondingly eight slices 102_0 through 102_7. Other circuitry that is not described herein is merely denoted as "other slice logic" 140_0 through 140_7.

In the illustrated embodiment, a three-level cache system is employed, which includes a level one (L1) cache, a level two (L2) cache, and a level three (L3) cache. The L1 cache is separated into both a data cache and an instruction cache, respectively denoted as L1D and L1I. The L2 cache also resides on core, meaning that both the level one cache and the level two cache are in the same circuitry as the core of each slice. That is, each core of each slice has its own dedicated L1D, L1I, and L2 caches. Outside of the core, but within each slice is an L3 cache. In the preferred embodiment, the L3 cache 130_0 through 130_7 (also collectively referred to herein as 130) is a distributed cache, meaning that ⅛ of the L3 cache resides in slice 0 102_0, ⅛ of the L3 cache resides in slice 1 102_1, etc. In the preferred embodiment, each L1 cache is 32k in size, each L2 cache is 256k in size, and each slice of the L3 cache is 2 megabytes in size. Thus, the total size of the L3 cache is 16 megabytes.

Bus interface logic 120_0 through 120_7 is provided in each slice in order to manage communications from the various circuit components among the different slices. As illustrated in FIG. 1, a communication bus is 190 is utilized to allow communications among the various circuit slices, as well as with uncore circuitry 160. The uncore circuitry 160 merely denotes additional circuitry that is on the processor chip, but is not part of the core circuitry associated with each slice. As with each illustrated slice, the uncore circuitry 160 includes a bus interface circuit 162. Also illustrated is a memory controller 164 for interfacing with off-processor memory 180. Finally, other uncore logic 166 is broadly denoted by a block, which represents other circuitry that may be included as a part of the uncore processor circuitry (and again, which need not be described for an understanding of the invention).

To better illustrate certain inter and intra communications of some of the circuit components, the following example will be presented. This example illustrates communications associated with a hypothetical load miss in core6 cache. That is, this hypothetical assumes that the processing core 6 110_6 is executing code that requests a load for data at address hypothetical address 1000. When such a load request is encountered, the system first performs a lookup in L1D 114_6 to see if that data exists in the L1D cache. Assuming that the data is not in the L1D cache, then a lookup is performed in the L2 cache 112_6. Again, assuming that the data is not in the L2 cache, then a lookup is performed to see if the data exists in the L3 cache. As mentioned above, the L3 cache is a distributed cache, so the system first needs to determine which slice of the L3 cache the data should reside in, if in fact it resides in the L3 cache. As is known, this process can be performed using a hashing function, which is merely the exclusive ORing of bits, to get a three bit address (sufficient to identify which slice—slice 0 through slice 7—the data would be stored in).

In keeping with the example, assume this hashing function results in an indication that the data, if present in the L3 cache, would be present in that portion of the L3 cache residing in slice 7. A communication is then made from the L2 cache of slice 6 102_6 through bus interfaces 120_6 and 120_7 to the L3 slice present in slice 7 102_7. This communication is denoted in the figure by the circled number 1. If the data was present in the L3 cache, then it would be communicated back from L3 130_7 to the L2 cache 112_6. However, and in this example, assume that the data is not in the L3 cache either, resulting in a cache miss. Consequently, a communication is made from the L3 cache 130_7 through bus interface 7 120_7 through the uncore bus interface 162 to the off-chip memory 180, through the memory controller 164. This communication is denoted in the figure by the circled number 2. A cache line that includes the data residing at address 1000 is then communicated from the off-chip memory 180 back through memory controller 164 and uncore bus interface 162 into the L3 cache 130_7, as denoted by circled number 3. After that data is written into the L3 cache, it is then communicated to the requesting core, core 6 110_6 through the bus interfaces 120_7 and 120_6.

Figure 2:
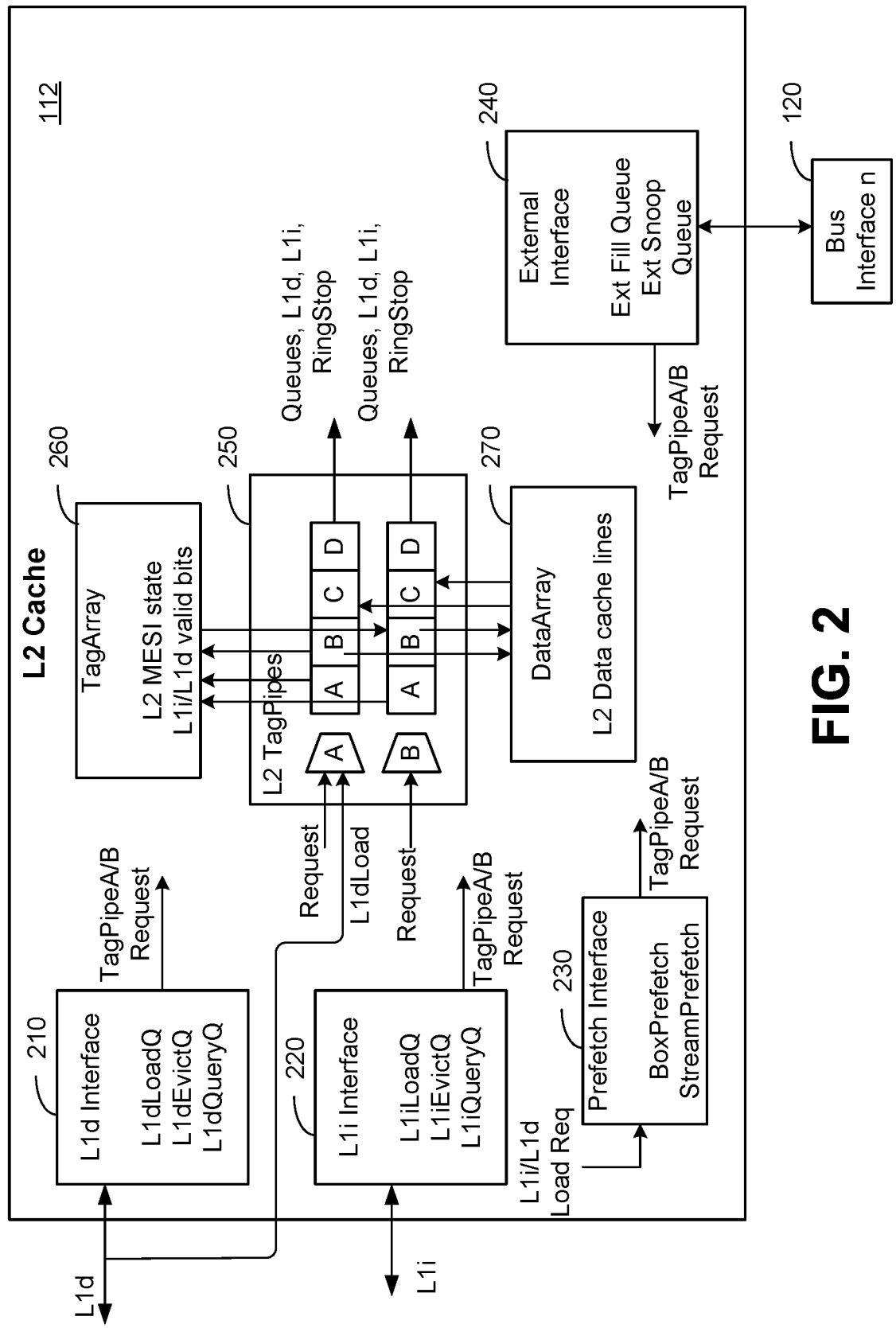
FIG. 2 is a block diagram showing certain features of a cache memory, primarily utilized for communications with other system components.

At this point, once the load request has been completed, that data will reside in each of the caches L3, L2, and L1D. Certain embodiments of the present invention are directed to a cache data eviction system that resides in a cache memory system, and in the examples that follow, in the L1D and L2 caches. Before describing details of the cache data eviction system, reference is first made to FIG. 2, which is a block diagram illustrating various circuit components of each of the L2 caches 112. Specifically, the components illustrated in FIG. 2 depict basic features of a structure that facilitates the communications within the L2 cache 112 and with other components in the system illustrated in FIG. 1. First, there are four boxes 210, 220, 230, and 240, which illustrate an L1D interface 210, an L1I interface 220, a prefetch interface 230, and an external interface 240. Collectively, these boxes denote circuitry that queue and track transactions or requests through the L2 cache 112. As illustrated in FIG. 1, in each core, there is both an L1D and L1I cache, and a higher level L2 cache. The L1D interface 210 and L1I interface 220 interface the L2 cache with the L1 caches. These interfaces implement a load queue, an evict queue and a query queue, for example, as mechanisms to facilitate this communication. The prefetch interface 230 is circuitry that facilitates communications associated with prefetching. In one embodiment, the prefetcher implements both a bounding box prefetch algorithm and a stream prefetch algorithm, and ultimately makes a prefetch determination as a result of the combination of the results of those two algorithms. The bounding box prefetch algorithm may be similar to that described in U.S. Pat. No. 8,880,807, which is incorporated herein by reference. There are numerous, known stream prefetching algorithms, which may be utilized by the prefetcher.

As will be appreciated by those skilled in the art, the prefetching algorithms are performed in part by monitoring load requests from a respective core to the associated L1I and L1D caches. Accordingly, these are illustrated as inputs to the prefetch interface 230. The output of the prefetch interface 230 is in the form of a request to access tagpipe 250, whose relevant function, which is briefly described herein, will be appreciated by persons skilled in the art. Finally, the external interface 240 provides the interface to components outside the L2 cache and indeed outside the processor core. As described in connection with FIG. 1, such communications, particularly off-slice communications, are routed through the bus interface 120.

As illustrated in FIG. 2, each of the circuit blocks 210, 220, 230, and 240, have outputs that are denoted as tagpipe (access) requests. Tagpipes 250 are provided as a central point through which almost all L2 cache traffic travels. In the illustrated embodiment, there are two tagpipes denoted as A and B. Two such tagpipes are provided merely for load balancing, and as such the tagpipe requests that are output from circuits 210, 220, 230, and 240, the various interface circuits, can be directed to either tagpipe A or tagpipe B, again based on load balancing. In one embodiment, the tagpipes are four stage pipes, with the stages denoted by letters A, B, C, and D. Transactions to access the tag/data arrays via the tagpipes, sometimes referred to herein as "tagpipe requests," advance through the stages of the tagpipe 250. During the A stage, a transaction requests access into the tagpipe. During the B stage, the tag is sent to the arrays (tag array 260 and data array 270). During the C stage, MESI information and indication of whether the tag hit or miss is received from the arrays and a determination is made on what action to take in view of the information received from the array. During the D stage, the action decision (complete/replay, push a FillQ, etc.) is staged back to the requesting queues.

Finally, FIG. 2 illustrates a tag array 260 and data array 270. The tag array 260 effectively or essentially includes metadata while the data array is the memory space that includes the actual cache lines of data. The metadata in the tag array 260 includes MESI state as well as the L1I and L1D valid bits. As is known, the MESI state defines whether the data stored in the data array are in one of the modified ("M"), exclusive ("E"), shared ("S"), or invalid ("I") states.

A similar, but previous, version of this architecture is described in U.S. 2016/0350215, which is hereby incorporated by reference. As an understanding of the specifics with respect to the intra-circuit component communication is not necessary for an understanding of the present invention, and indeed is within the level of skill of persons of ordinary skill in the art, it need not be described any further herein.

Figure 3:
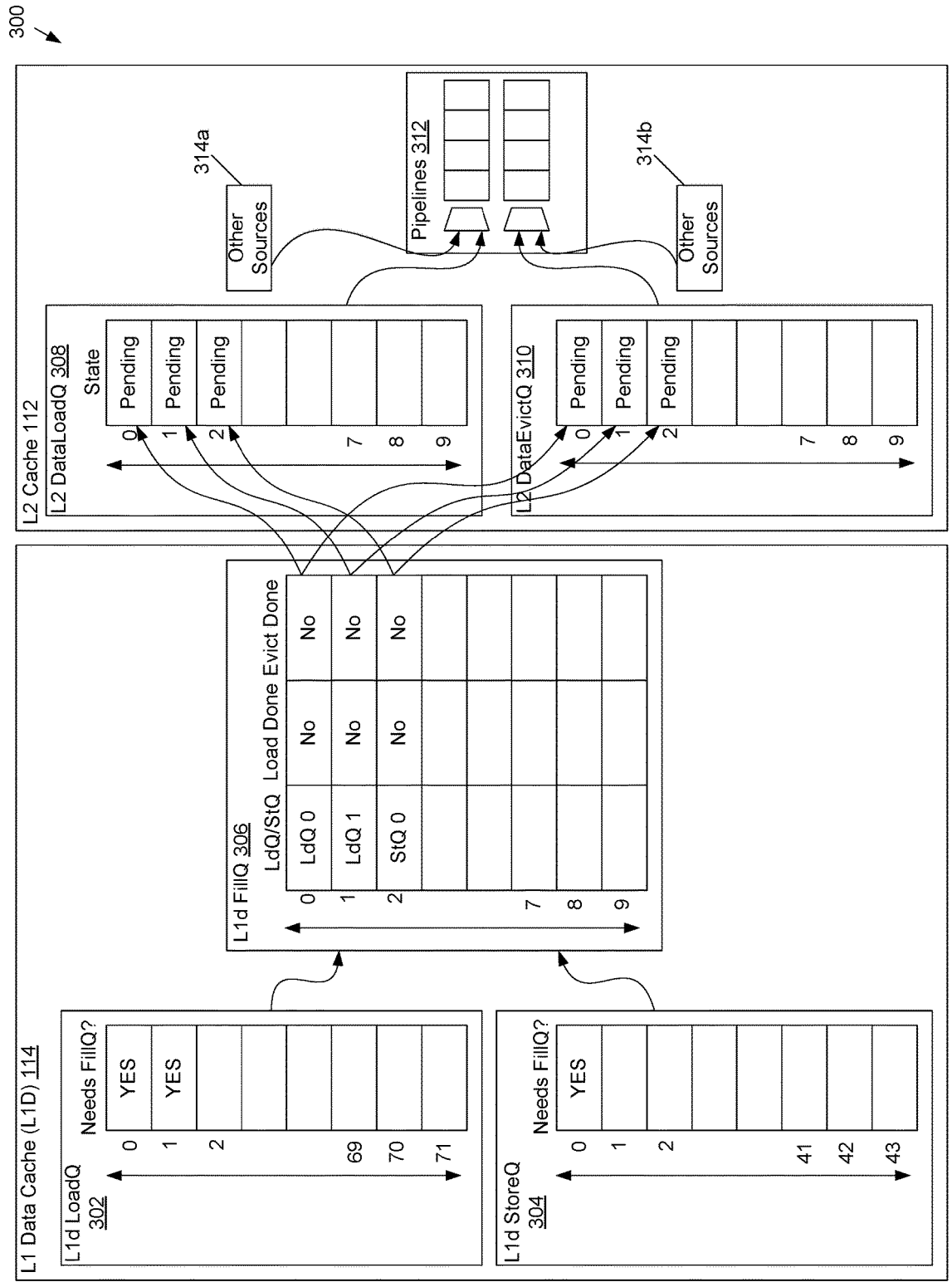
FIG. 3 is a block diagram of an embodiment of a cache data eviction system.

Having provided a description of an example overall environment in which certain embodiments of a cache data eviction system may be implemented, attention is now directed to FIG. 3, which shows an embodiment of a cache data eviction system 300. The cache data eviction system 300 comprises the L1 data (L1D) cache 114 and the L2 cache 112. The L1 data cache 114 comprises an L1D load queue (L1d LoadQ) 302, an L1D store queue (L1d StoreQ) 304, and an L1D fill queue (L1d FillQ) 306. The L2 cache comprises an L2 data load queue (L2 data loadQ) 308, an L2 data evict queue (L2 data evictQ) 310, and tag and data array pipelines 312, for which the L2 data loadQ 308 and the L2 data evictQ 310 compete for access with other sources 314 (e.g., 314a, 314b). Note that the tag and array pipelines 312 may correspond to the components shown in FIG. 2 (e.g., 250, 260, and 270).

Referring first to illustrated components of the L1 data cache 114, the L1D load queue 302 comprises a queue of load operations, some of which may need to access the L2 cache 112 and hence further providing an indication (e.g., bit status) of whether an entry is to be allocated in the L1D fill queue 306. To determine if the L1 data cache 114 has the data for a given load operation, the L1D load queue 302 requests access to the tag array, and if there is a hit, accesses the L1 data cache array and fulfills that request and makes whatever changes to the MESI state are needed, as is conventional. In the case the cache line requested is not identified in the tag array (e.g., a miss), the L1D load queue 302 seeks to service the load operation via the L2 cache 112.

Accordingly, the L1D load queue 302 requests allocation of an entry in the L1D fill queue 306 (e.g., to bring the cache line in from the L2 cache 112, or possibly beyond). In one embodiment, the L1D load queue 302 comprises seventy-two (72) entries for respective load operations, though in some embodiments, a different quantity of entries may be used.

The L1D store queue 304 comprises a queue of store operations, some of which may need to access the L2 cache 112 and hence further providing an indication (e.g., bit status) of whether an entry is to be allocated in the L1D fill queue 306 based on a similar process to that described above for the load request handled by the L1D load queue 302, and hence discussion of the same or similar is omitted here for brevity. In one embodiment, the L1D store queue 304 comprises forty-four (44) entries for respective store operations, though in some embodiments, a different quantity of entries may be used.

The L1D fill queue 306 comprises a queue of load and/or store operations that need to access the L2 cache 112. Each entry of the L1D fill queue 306 corresponds to an L1D load queue entry, an L1D store queue entry, or a prefetch, or in some embodiments, tablewalk requests (e.g., to traverse a linear to physical mapping based on a miss in a translation lookaside buffer). The L1D fill queue 306 is further configured to allocate space for a new cache line (e.g., to evict data from the L1 data cache 114) and to bring in a new cache line into the L1 data cache 114 (e.g., into a location of the previously evicted data). In one embodiment, the L1D fill queue 306 comprises plural entries for the load or store operation, where each entry tracks its corresponding allocation and eviction. In one embodiment, there are ten (10) entries, though in some embodiments, a different quantity of entries may be used.

Referring now to the illustrated components of the L2 cache 112, the L2 data load queue 308 comprises a queue of L1D allocation requests, and an indication (e.g., state, such as pending) for each entry of the status of the allocation request at the L2 cache 112. In one embodiment, the L2 data load queue 308 comprises ten (10) entries, though in some embodiments, a different quantity of entries may be used. As represented by the example arrow head lines in FIG. 3, each entry of the L2 data load queue 308 is one-to-one mapped onto a respective entry of the L1D fill queue 306 (e.g., L1d FillQ[0] always uses L2DataLoadQ[0] for its L1D load allocation request).

The L2 data evict queue 310 comprises a queue of L1D evictions, and an indication (e.g., state, such as pending) for each entry of the status of the eviction at the L2 cache 112. In one embodiment, the L2 data evict queue 310 comprises ten (10) entries, though in some embodiments, a different quantity of entries may be used. As represented by the example arrow head lines in FIG. 3, each entry of the L2 data evict queue 310 is one-to-one mapped onto a respective entry of the L1D fill queue 306 (e.g., L1d FillQ[0] always uses L2DataEvictQ[0] for its eviction). The L2 cache 112 further comprises a bus (e.g., multi-hot bus) from the L2 data evict queue 310 to the L1D fill queue 306 with a valid bit for each entry of the L2 data evict queue 310 that indicates, when asserted, that an eviction is still being processed (e.g., EvQValid[0]=1 indicates to the corresponding L1D fill queue entry, L1dFillQ[0], that an eviction is still pending). Further, when an L1D fill queue entry (e.g., L1dFillQ[n]) is allocated, it must wait for the corresponding valid bit to be deasserted (e.g., EvQValid[n]=0) before sending its eviction, otherwise its eviction may overwrite a previous eviction from the same entry (e.g., L1dFillQ[n]).

The L2 data load queue 308 and the L2 data evict queue 310 request access to the pipelines 312 to access the tag array to determine if the L2 cache 112 possesses the L1-requested cache line, and in the case of a hit, the data array is accessed and the data (cache line) is returned to the L1 data cache 114. In the case of a miss in the tag array, a different cache (e.g., L3 cache) may be accessed to obtain the requested cache line. The L2 data evict queue 310 requests access to, for instance, write dirty data into the L2 cache array, update directory bits (of the L2 tag array) to reflect that the L1 data cache 114 no longer possesses the cache line being evicted. Note that the L2 cache 112 comprises a directory (not shown), as is known, which enables the L2 cache 112 to record such information as the L2 cache MESI state, whether a cache line is valid (using a valid bit) in the L1 data cache 114 (and L1I cache). Though both the L2 data load queue 308 and the L2 data evict queue 310 potentially need to access the tag and/or data array of the pipelines 312, it is noted that the other sources 314 are likewise competing for the pipeline resources. Other sources 314 may include I-cache requests, external snoops, other processing demands on the L2 cache 112 (e.g., data coming back from the L3 cache to be written into the data array and/or tag array). Despite the competition for the pipeline resources, the L2 cache 112 should also maintain suitable performance. For instance, one benchmark may be to handle one load request every single clock cycle out of the L2 cache 112, which is a challenge given all of these sources 314 that are trying to request access to the pipelines 312.

In one example operation, a load or store operation is queued in the L1D load queue 302 or the L1D store queue 304. When a load or store operation misses in the L1 data cache 114, an entry is allocated in the L1D fill queue 306. The L1D fill queue 306 in turn sends a load request to the L2 cache 112, which is tracked in the L2 data load queue 308. The L1D fill queue 306 may also need to evict a cache line to accommodate or make room for the new cache line, and if an eviction is needed, it is tracked by the L2 data evict queue 310. The L2 data evict queue 310 signals to the L1D fill queue 306 that the eviction is in progress using a valid bit (e.g., EvQValid, as described above), where each bit corresponds to a specific entry of the L2 data evict queue 310 (and thus the specific L1D fill queue entry).

Before describing an embodiment of the cache data eviction system 300, a brief digression is helpful to understand how there can be a backlog of evictions using conventional cache eviction techniques. Each L2 data evict queue entry tracks only one eviction for that entry at a time. Accordingly, an L1D fill queue entry must wait for its corresponding valid bit to deassert (assuming it is asserted) for a previous eviction before the L1D fill queue 306 can send a new eviction from that reallocated entry to the same L2 data evict queue entry. This behavior was implemented to prevent an L1D fill queue entry from overwriting the eviction from a previous incarnation of the L1D fill queue entry (e.g., if that eviction has not been completed by the time the L1D fill queue entry was reused). However, as noted in the description above, it has been observed that it is common for L1D fill queue entries, using past techniques, to be unable to send their evictions to the L2 data evict queue in a timely manner due to a backlog of L1 data evictions in the L2 cache, due primarily to the inability of the L2 to keep up with a steady stream of simultaneous loads and evictions.

The handling of cache line evictions in the cache data eviction system 300 is premised at least in part upon the recognition that, in certain cases, the L2 cache 112 can safely ignore certain evictions and allow a subsequent eviction immediately without violating cache coherency, thus enabling a subsequent L1D fill queue entry to send its eviction (e.g., based on a deasserted valid bit) without waiting for the prior eviction to complete. A further premise in the handling of cache line evictions in the cache data eviction system 300 is that performing an eviction is likely the result of the need to bring in a cache line into the L1 data cache 114, which implies the higher priority need to service or process a load. In one embodiment, if the L1 data cache 114 is evicting a dirty cache line (e.g., having a modified (M) MESI state), the L2 cache 112 needs to process the eviction to keep the caches coherent (and thus delay a subsequent eviction from the same L1D fill queue entry). However, in cases where the L1 data cache 114 is evicting a clean cache line (e.g., having a shared (S) or exclusive (E) MESI state), the eviction is not actually required for cache coherency. Rather, the eviction is merely used by the L2 cache 112 to update its directory (e.g., by clearing an L1 data cache valid bit corresponding to the evicted cache line) to prevent a potential unnecessary snoop request.

In an embodiment of the cache data eviction system 300, the L2 data evict queue 310, upon receiving an eviction from the L1D fill queue 306, asserts its valid bit signal (EvQValid) to the L2 cache 112, and then immediately (e.g., within approximately two clock cycles) deasserts the valid bit signal along the bus to the L1D fill queue 306 if the state of the cache line being evicted is clean (e.g., an S or E MESI state). Note that if the cache line being evicted is dirty (e.g., an M MESI state), the standard eviction process proceeds until completion before the valid bit is deasserted. For the case of a clean eviction, the L2 data evict queue 310 continues to process the eviction until an earlier of completion of the eviction or receipt of a subsequent eviction from the same L1D fill queue entry (e.g., which overwrites the older, clean eviction in the L2 data evict queue 310). Accordingly, the early indication by the L2 data evict queue 310 to the L1D fill queue 306 that its eviction has completed (even before it has actually completed via an update to the L2 cache directory) enables the same entry in the L1D fill queue 306 to immediately begin its eviction process once the entry is reallocated for a later allocation.

Note that in some embodiments, each entry of the queues shown in FIG. 3 comprises its own control logic or state machine that operate in parallel, in addition to control logic for overall or aggregate operations of the L1 data cache 114 and the L2 cache 112 as would be appreciated by one having ordinary skill in the art.

Figure 4:
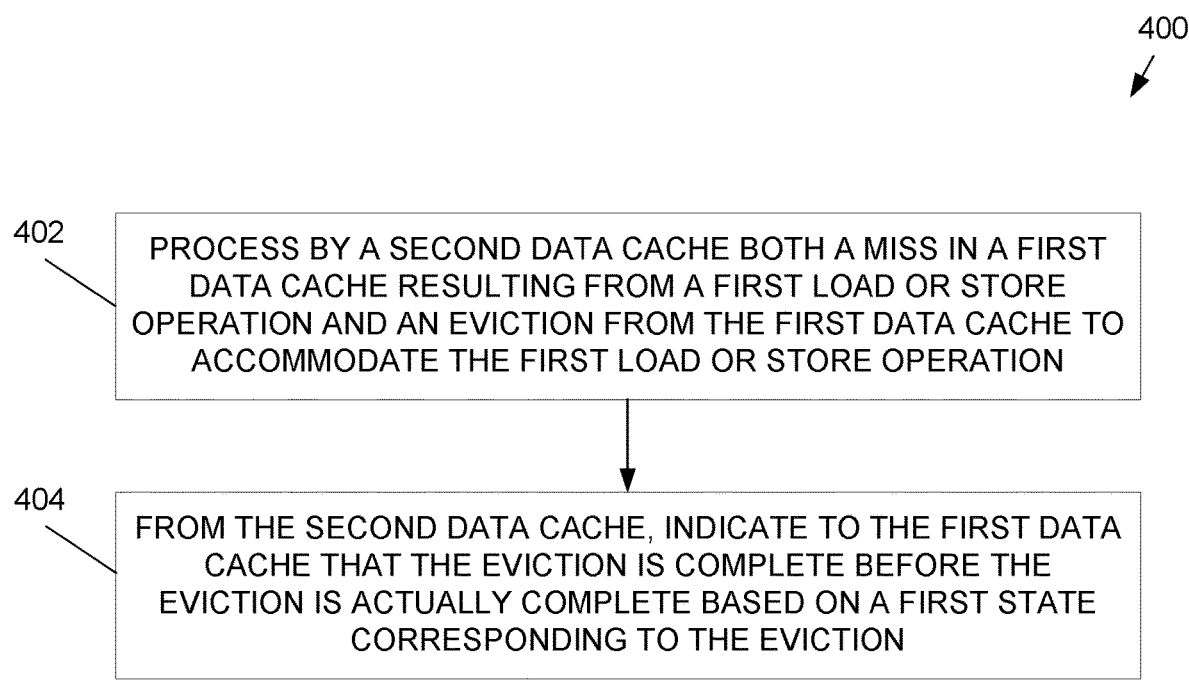
FIG. 4 is a flow diagram of an embodiment of an example cache data eviction method.

Having described certain embodiments of a cache data eviction system, one having ordinary skill will appreciate that one embodiment of a data cache eviction method, depicted in FIG. 4 and denoted as method 400, may be implemented in a microprocessor, and in particular, in the cache data eviction system 300 (FIG. 3). In one embodiment, the method 400 comprises processing by a second data cache both a miss in a first data cache resulting from a first load or store operation and an eviction from the first data cache to accommodate the first load or store operation (402); and from the second data cache, indicating to the first data cache that the eviction is complete before the eviction is actually complete based on a first state corresponding to the eviction (404).

Any process descriptions or blocks in flow diagrams should be understood as representing modules, segments, logic, or portions of code which include one or more executable instructions for implementing specific logical functions or steps in the process, and alternate implementations are included within the scope of the embodiments in which functions may be executed out of order from that shown or discussed, including substantially concurrently or in different order, depending on the functionality involved, as would be understood by those reasonably skilled in the art of the present disclosure.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

The invention claimed is:

1. A microprocessor, comprising:
a first data cache; and
a second data cache configured to process both a miss in the first data cache resulting from a first load or store operation and an eviction from the first data cache to accommodate the first load or store operation, the second data cache configured to indicate to the first data cache that the eviction is complete before the eviction is actually complete based on a first state corresponding to the eviction.

2. The microprocessor of claim 1, wherein the second data cache continues to process the eviction after sending the indication to the first data cache until an earlier of the eviction is actually complete by updating a directory in the second data cache or the eviction is overwritten.

3. The microprocessor of claim 1, wherein the first state corresponds to an evicted cache line that has not been modified since its allocation into the first data cache.

4. The microprocessor of claim 1, wherein the first state corresponds to an evicted cache line comprising an exclusive or shared MESI state.

5. The microprocessor of claim 1, wherein the second data cache is further configured to process both a miss in the first data cache resulting from a second load or store operation and another eviction from the first data cache to accommodate the second load or store operation, the second data cache configured to indicate to the first data cache that the another eviction is pending until the another eviction is actually complete based on a second state corresponding to the another eviction.

6. The microprocessor of claim 5, wherein the second state corresponds to an evicted cache line that has been modified and is allocated to the first data cache.

7. The microprocessor of claim 5, wherein the second state corresponds to an evicted cache line that includes a modified MESI state.

8. A cache memory system, comprising:
an L1 data cache comprising an L1 data load queue, an L1 data store queue, and an L1 data fill queue, the L1 data fill queue configured to allocate an entry, corresponding to a first load or store operation in the L1 data store queue or the L1 data store queue, respectively, in the L1 data fill queue based on a miss in the L1 data cache and to evict first data from the L1 data cache to allocate room for the first load or store operation; and
an L2 data cache comprising an L2 data load queue configured to receive an L1 data cache allocation request for the first load or store operation and an L2 data evict queue configured to receive the first data, the entry mapped to respective entries of the L2 data load queue and the L2 data evict queue, the L2 data evict queue configured to indicate to the L1 data fill queue that the eviction of the first data is complete before the eviction is actually complete based on a first state corresponding to the first data.

9. The cache memory system of claim 8, wherein the L2 data cache further comprises tag array and data array pipelines, wherein the L2 data evict queue is further configured to request access to the pipelines after sending the indication to the L1 data fill queue until an earlier of the eviction of the first data is actually complete by updating a directory in the L2 data cache or the eviction is overwritten by reallocated data to the same entry of the L1 data fill queue.

10. The cache memory system of claim 8, further comprising a bus comprising a bit value configured to communicate the indication, wherein the bit value is asserted upon receiving the eviction and then immediately deasserted to enable the L1 data fill queue to evict second data when the entry is reallocated for another eviction for a second load or store operation based on another miss in the L1 data cache.

11. The cache memory system of claim 8, wherein the first state corresponding to the first data comprises an indication that the first data has not been modified and is allocated to the L1 data cache.

12. The cache memory system of claim 8, wherein the first state corresponding to the first data comprises an exclusive or shared MESI state.

13. The cache memory system of claim 8, wherein the L1 data fill queue is further configured to allocate an entry, corresponding to a third load or store operation in the L1 data store queue or the L1 data store queue, respectively, based on a miss in the L1 data cache and to evict third data from the L1 data cache to allocate room for the third load or store operation, the L2 data load queue is further configured to receive an L1 data cache allocation request for the third load or store operation and the L2 data evict queue is further configured to receive the third data, the entry corresponding to the third load or store operation mapped to respective entries of the L2 data load queue and the L2 data evict queue, the L2 data evict queue configured to indicate to the L1 data fill queue that the eviction of the third data is pending until the eviction is actually complete based on a second state corresponding to the third data.

14. The cache memory system of claim 13, wherein the second state corresponding to the third data comprises an indication that the third data has been modified and is allocated to the L1 data cache.

15. The cache memory system of claim 13, wherein the second state corresponding to the third data includes a modified MESI state.

16. A method implemented in a cache memory system of a microprocessor, the method comprising:
processing by a second data cache both a miss in a first data cache resulting from a first load or store operation and an eviction from the first data cache to accommodate the first load or store operation; and
from the second data cache, indicating to the first data cache that the eviction is complete before the eviction is actually complete based on a first state corresponding to the eviction.

17. The method of claim 16, further comprising the second data cache continuing to process the eviction after sending the indication to the first data cache until an earlier of the eviction is actually complete by updating a directory in the second data cache or the eviction is overwritten.

18. The method of claim 16, wherein the first state corresponds to an evicted cache line that has not been modified and is allocated to the first data cache.

19. The method of claim 16, further comprising the second data cache:
    processing both a miss in the first data cache resulting from a second load or store operation and another eviction from the first data cache to accommodate the second load or store operation; and
    indicating to the first data cache that the another eviction is pending until the another eviction is actually complete based on a second state corresponding to the another eviction.

20. The method of claim 19, wherein the second state corresponds to an evicted cache line that has been modified and is allocated to the first data cache.

* * * * *